(12) United States Patent
Ono et al.

(10) Patent No.: US 7,442,568 B1
(45) Date of Patent: Oct. 28, 2008

(54) METHOD TO FABRICATE COMBINED UV LIGHT EMITTER AND PHOSPHOR FOR WHITE LIGHT GENERATION

(75) Inventors: Yoshi Ono, Camas, WA (US); Wei Pan, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 238 days.

(21) Appl. No.: 11/588,890

(22) Filed: Oct. 27, 2006

(51) Int. Cl.
*H01L 21/00* (2006.01)
(52) U.S. Cl. .......................................... 438/34; 977/847
(58) Field of Classification Search .................... 438/20, 438/22, 34; 977/742, 754, 763, 939, 949
See application file for complete search history.

(56) References Cited

U.S. PATENT DOCUMENTS

2007/0099441 A1* 5/2007 Conley et al. ............... 438/800

2007/0264478 A1* 11/2007 Liao et al. ................. 428/195.1

OTHER PUBLICATIONS

J.M. Green et al, "ZnO nanoparticle coated carbon nanotubes demonstrating enhanced electron field-emission properties", May 12, 2006, Journal of Applied Physics, vol. 99, pp. 094308-1-094308-4.*
U.S. Appl. No. 11/262,439, filed Oct. 28, 2005, Conley et al.
Zhong et al., *Morphological evolution of metal nanoparticles on surfaces of carbon nanotubes*, Appl. Phys. Lett. 87, 133105 (2005).

* cited by examiner

*Primary Examiner*—David Vu
*Assistant Examiner*—Suberr Chi
(74) *Attorney, Agent, or Firm*—David C. Ripma

(57) ABSTRACT

A method of forming carbon nanotubes includes incorporating phosphors in the form of quantum dots, along with the beads of ZnO on carbon nanotubes (CNTs) to generate white light. The ability to form a high density of quantum dots in a small volume allows for a high probability of UV absorption and subsequent re-emission to generate visible radiation. The material and size of the quantum dots can be controlled by an atomic layer deposition (ALD) process and thermal cycle.

9 Claims, 1 Drawing Sheet

METHOD TO FABRICATE COMBINED UV LIGHT EMITTER AND PHOSPHOR FOR WHITE LIGHT GENERATION

FIELD OF THE INVENTION

This invention relates to luminaires, and specifically to a luminair which emits near UV wavelength light

BACKGROUND OF THE INVENTION

A source of light for indoor home and office environments is usually fluorescent light bulbs. The dominance of fluorescent lighting came about due to its superior efficiency and lifetime, compared to incandescent light bulbs. With advances in material science and nanotechnology, new light sources are being developed, which will exceed the efficiencies and longevity of fluorescent lights.

The spectral output of fluorescent lights does not cover the full visible light spectrum. Most of the light is in the red-orange region, with a few sharp peaks in the blue region. Because of this, the appearance of objects and people illuminated by fluorescent lighting differs considerably compared to the appearance of the same object and people illuminated by sunlight or incandescent light. Because lighting, and specifically the light spectrum, affects people's moods and influences the aesthetic perception of objects and people, better lighting technology is desirable. In addition, lighting is a major use of the world energy supply. A more efficient source of lighting provides energy savings and cost reduction.

The efficient generation of full spectrum white light is an important research topic because of the potential impact on the economies of lighting.

The most dominant form of lighting currently in use is fluorescent light, where an arc discharge of a gaseous mixture of Ar and Hg vapor produces UV light having a wavelength of about 420 nm, and where a phosphors coating the inside of a fluorescent tube convert the UV to visible light. A newer form of lighting takes advantage of light emitting diodes, and uses solid state materials in Groups III-V, such as InP, GaAs, etc., and where p-n doped junctions function as LEDs. LED light sources are generally more efficient, however, they produce only a single color of light, i.e., they generate light in a relatively narrow band of the visible light spectrum, and they are more expensive to manufacture than conventional incandescent or fluorescent lights. A general overview of solid state lighting as well as the direction of the technology is outlined in http://lighting.sandia.gov/lightingdocs/OIDA_SS-L_LED_Roadmap_Full.pdf

SUMMARY OF THE INVENTION

A method to fabricate a combined UV light emitter and phosphor for white light generation includes preparing a silicon substrate-electrode; growing carbon nanotubes on the silicon substrate-electrode; atomic layer deposition of ZnO on the carbon nanotubes; annealing the ZnO and carbon nanotubes to produce nanobeads on the ZnO; bonding the free ends of the carbon nanotubes to a graphite sheet-electrode, forming a UV light emitter; encapsulating the UV light emitter in a housing having a power supply connected to the silicon substrate-electrode and the graphite sheet-electrode.

It is an object of the invention to provide an energy efficient luminair which generate near white light.

This summary and objectives of the invention are provided to enable quick comprehension of the nature of the invention. A more thorough understanding of the invention may be obtained by reference to the following detailed description of the preferred embodiment of the invention in connection with the drawings.

DETAILED DESCRIPTION OF THE PREFERRED EMBODIMENTS

In this invention, we disclose a method to incorporate phosphors, in the form of quantum dots along with the beads of ZnO on carbon nanotubes (CNTs) to generate white light. The ability to form a high density of quantum dots in a small volume allows for a high probability of UV absorption and subsequent re-emission to generate visible radiation. The material and size of the quantum dots can be controlled by an atomic layer deposition (ALD) process and thermal cycle. A prototype device has been fabricated with optimization of the ALD depositions and anneals.

The method of the invention provides a light source which allows the spectral properties to be tuned, to optimize the spectral property's effect on the visual properties of objects and people. The method of the invention uses nanotechnology and nanoscale deposition techniques, which have been investigated in a laboratory setting. The strategy is a two step approach, much like that used in fluorescent lighting technology. In the first step, UV light is generated; and in the second step, wavelength conversion is performed to down-convert the light to the visible region. In a previous disclosure, Conley, et al., Carbon Nanotube with ZnO Asperities, U.S. patent application Ser. No. 11/262,439, filed Oct. 28, 2005, demonstrated how carbon nanotubes (CNTs) coated with a thin atomic layer deposition (ALD) of ZnO film forms tiny beads after an anneal. The field emission properties of these coated CNTs were significantly enhanced and UV light was observed emanating from the ZnO beads.

Figure 1:
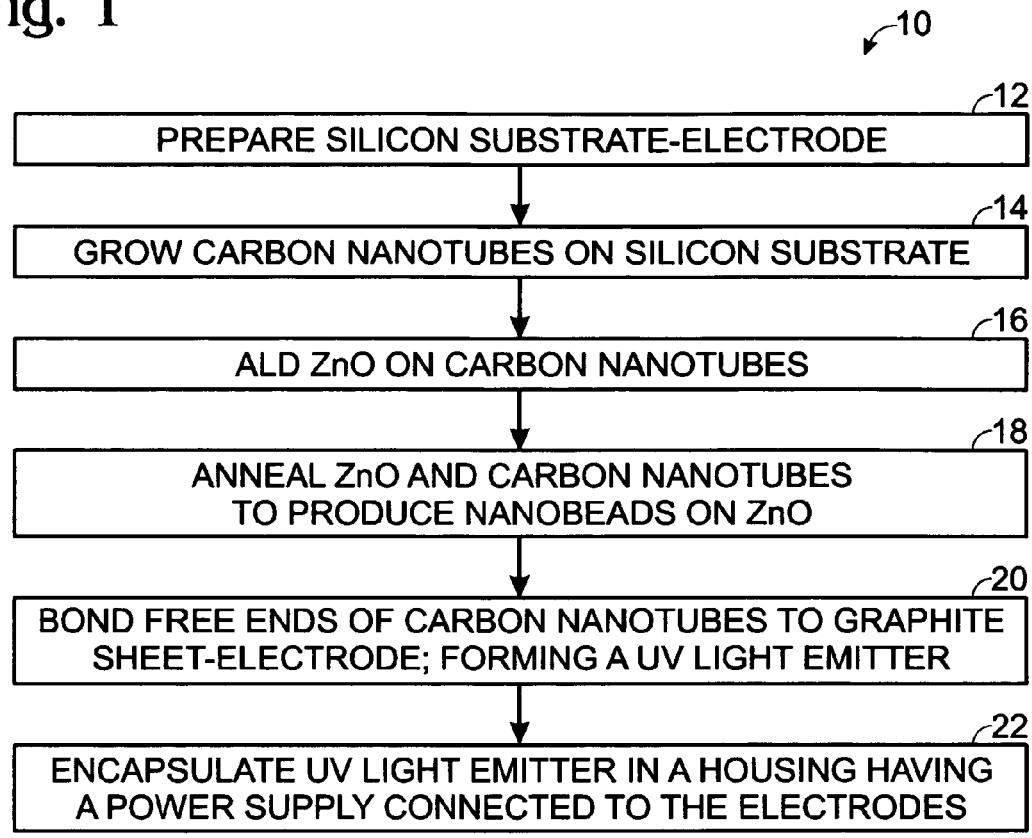
FIG. 1 is a block diagram depicting the steps in fabricating a device according to the method of the invention.

Carbon nanotubes can be grown on silicon wafers by a number of techniques. Referring initially to FIG. 1, a block diagram of the method of the invention is depicted generally at 10. The first step in the method of the invention is preparation of a silicon substrate, 12. One technique involves the use of a metal catalyst, such as iron (Fe) on a wafer, and placing the wafer into a vacuum chamber, where it can be heated to above 400 C. A gaseous mixture of a hydrocarbon, such as acetylene, is introduced, and a plasma environment assists in the growth of carbon nanotubes on the silicon surface, 14, forming a carbon nanotube layer. The CNTs have one end attached to the surface of the wafer and the other end extending away from the surface. The metal catalyst layer may be patterned prior to CNT growth to selectively place the CNTs where desired. The substrate acts as one of the electrodes in the circuit.

ALD of ZnO is performed 16, according to the previous disclosed technique, Conley et al., supra. Anneal 18 of the layer results in the formation of tiny beads on the surface of the CNTs. It is from these nanobeads that the UV light is generated. The nanobeads result from the self-organization phenomenon seen previously with CNTs, e.g., Zhong et al., *Morphological evolution of metal nanoparticles on surfaces*

*of carbon nanotubes*, Appl. Phys. Lett. 87, 133105 (2005). The surface of the CNT is compressed to a graphite sheet, where the carbon bonding is fully satisfied with neighboring carbon, 20, resulting in a UV light emitter. Chemical bonds do not form between the ALD film and CNTs, so agglomeration of the deposited material takes place when conditions allow the deposited material to diffuse. The regions between the nanobeads on the CNT surface are believed to be free of any ZnO. The UV light emitter is encapsulated in a suitable housing, 22, which housing allows connection of the electrodes therein to a power supply.

Figure 2:
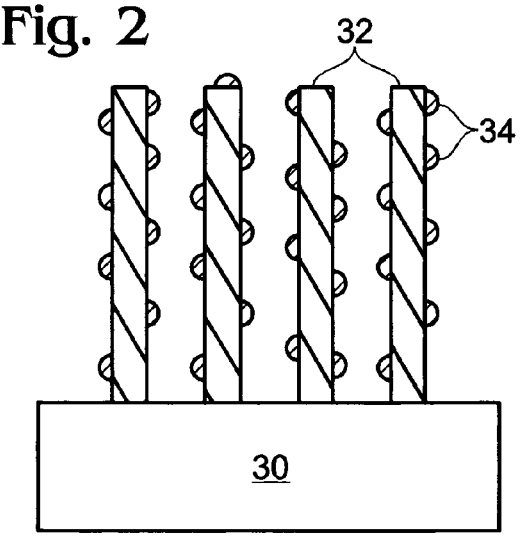
FIG. 2 is a schematic representation of a CNT formed on a silicon substrate electrode constructed according to the method of the invention.
Figure 3:
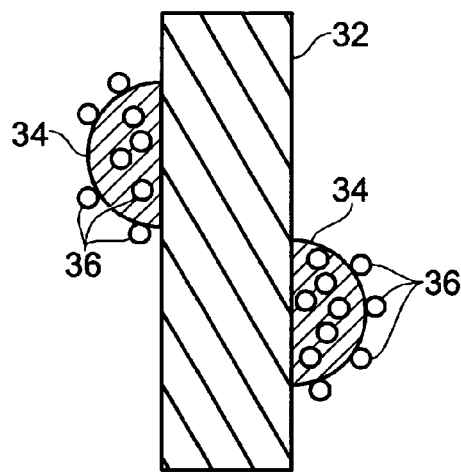
FIG. 3 is an enlarged portion of FIG. 2, showing ZnO and nanobeads.

Referring to FIGS. 2 and 3, a silicon substrate 30 has an array of CNTs 32 formed thereon according to the method of the invention. After ALD of ZnO, ZnO balls 34 are formed on the CNTs, forming what is referred to herein as a ZnO layer. Nanobeads 36 are formed after annealing of the ZnO and CNTs.

The deposition of a thin layer of $Al_2O_3$ as an insulating layer is optional. This layer is known to assist in the crystallization of the ZnO into the Wurtzite structure with the c-axis normal to the film. The $Al_2O_3$ may be deposited on the carbon nanotube layer or on the ZnO layer. An ALD film of GaN or another precursor for quantum dot formation is deposited and annealed to allow the self-assembly into nanophosphors which function to convert UV into visible light.

Thus, a method to fabricate a combined UV light emitter and phosphor for white light generation has been disclosed. It will be appreciated that further variations and modifications thereof may be made within the scope of the invention as defined in the appended claims.

We claim:

1. A method to fabricate a combined UV light emitter and phosphor for white light generation comprising:
    preparing a silicon substrate-electrode;
    growing carbon nanotubes on the silicon substrate-electrode;
    atomic layer deposition of ZnO on the carbon nanotubes;
    annealing the ZnO and carbon nanotubes to produce nanobeads on the ZnO;
    bonding the free ends of the carbon nanotubes to a graphite sheet-electrode, forming a UV light emitter;
    encapsulating the UV light emitter in a housing having a power supply connected to the silicon substrate-electrode and the graphite sheet-electrode.

2. The method of claim 1 wherein said growing includes providing a metal catalyst on the silicon substrate-electrode.

3. The method of claim 2 which further includes patterning the metal catalyst to grow carbon nanotubes selectively on the silicon substrate-electrode.

4. The method of claim 1 which includes depositing a layer of $Al_2O_3$ as an insulating layer on a layer taken from the group of layers consisting of the carbon nanotubes and the ZnO.

5. The method of claim 1 which includes atomic layer deposition and annealing of a quantum dot precursor on the carbon nanotubes to facilitate nanobead formation.

6. A method to fabricate a combined UV light emitter and phosphor for white light generation comprising:
    preparing a silicon substrate-electrode;
    growing carbon nanotubes on the silicon substrate-electrode;
    atomic layer deposition of ZnO on the carbon nanotubes;
    atomic layer deposition and annealing of a quantum dot precursor on the carbon nanotubes to facilitate nanobead formation;
    annealing the ZnO and carbon nanotubes to produce nanobeads on the ZnO;
    bonding the free ends of the carbon nanotubes to a graphite sheet-electrode, forming a UV light emitter;
    encapsulating the UV light emitter in a housing having a power supply connected to the silicon substrate-electrode and the graphite sheet-electrode.

7. The method of claim 6 wherein said growing includes providing a metal catalyst on the silicon substrate-electrode.

8. The method of claim 7 which further includes patterning the metal catalyst to grow carbon nanotubes selectively on the silicon substrate-electrode.

9. The method of claim 6 which includes depositing a layer of $Al_2O_3$ as an insulating layer on a layer taken from the group of layers consisting of the carbon nanotubes and the ZnO.

\* \* \* \* \*